Figure 1:
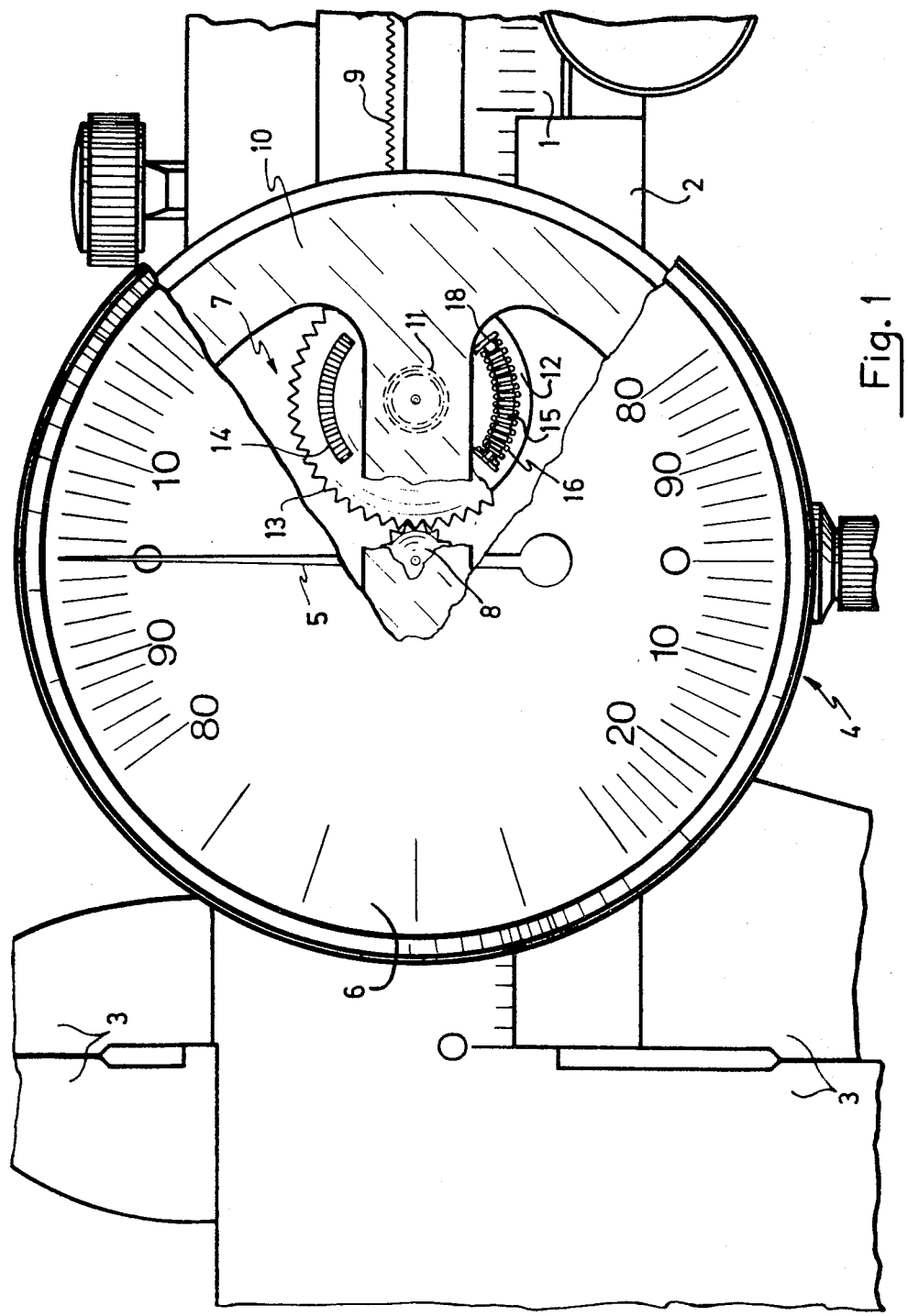

United States Patent
Gattesco

[15] 3,661,027
[45] May 9, 1972

[54] DIAL-TYPE MEASURING INSTRUMENTS
[72] Inventor: Giovanni Gattesco, Crissier, Switzerland
[73] Assignee: Tesa S.A., Renens, Switzerland
[22] Filed: May 21, 1970
[21] Appl. No.: 39,328

[30] Foreign Application Priority Data
June 18, 1969 Switzerland .......................... 9283/69

[52] U.S. Cl. ................................................. 74/411
[51] Int. Cl. ................................................... F16h 57/10
[58] Field of Search ....................................... 74/411

[56] References Cited

UNITED STATES PATENTS

| | | |
|---|---|---|
| 2,928,288 | 3/1960 | Bliss et al. ............................. 74/411 |
| 3,359,819 | 12/1967 | Veilette et al. ......................... 74/411 X |
| 3,208,298 | 9/1965 | Pickles .................................. 74/411 |
| 3,443,449 | 5/1969 | Kotarski ................................ 74/411 X |

Primary Examiner—Leonard H. Gerin
Attorney—James M. Heilman and Heilman & Heilman

[57] ABSTRACT

The present invention provides a dial-type measuring instrument comprising a geared multiplier mechanism intended to amplify the movements of a movable indicator member facing the dial, wherein the multiplier mechanism comprises a disk driven by the movable measuring member of the instrument and located opposite a toothed wheel which serves to control the movements of the indicator member and is coaxial with the disk, said toothed wheel being connected to the disk by means of at least two resilient constraining members.

4 Claims, 4 Drawing Figures

INVENTOR.
GIOVANNI GATTESCO
BY James M. Heilman
ATTORNEY

INVENTOR.
GIOVANNI GATTESCO

DIAL-TYPE MEASURING INSTRUMENTS

This invention relates to dial-type measuring instruments comprising a geared multiplier mechanism intended to amplify the movements of a movable indicator member facing the dial and more particularly, but not exclusively, to comparators and dial gauges. These instruments which are of great value because they permit rapid, accurate, and easy reading, nevertheless have the disadvantage of being delicate because the gears of the multiplier mechanism break relatively easily when the movable measuring member of the instrument arrives abruptly at the end of its travel or when it is moved by sharp blows.

Attempts have been made to reduce this weakness by introducing various anti-shock systems between the movable measuring member and the multiplier mechanism. These systems which utilize elastic means absorbing the shock received by the movable measuring member, act in one direction only and therefore their role is thus incomplete. Moreover, some of them use relatively fragile support members, such as pins and eyebolts.

With the aim of remedying these disadvantages, the present invention provides a dial-type measuring instrument comprising a geared multiplier mechanism intended to amplify the movements of a movable indicator member facing the dial, wherein the multiplier mechanism comprises a disk driven by the movable measuring member of the instrument and located opposite a toothed wheel which serves to control the movements of the indicator member and is coaxial with the disk, said toothed wheel being connected to the disk by means of at least two resilient constraining members, of which the axes are located one on either side of the common axis of the toothed wheel and the disk and located in a plane perpendicular to said common axis.

The accompanying drawings show by way of example two embodiments of the invention.

Figure 3:
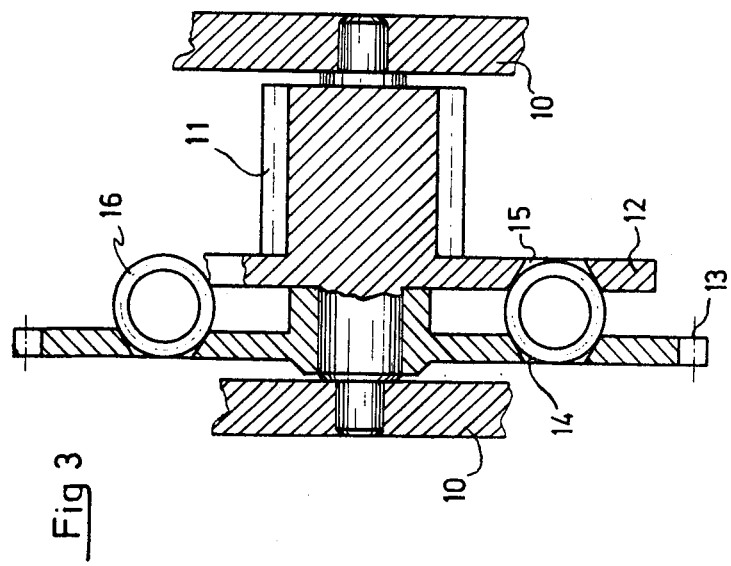
Figure 2:
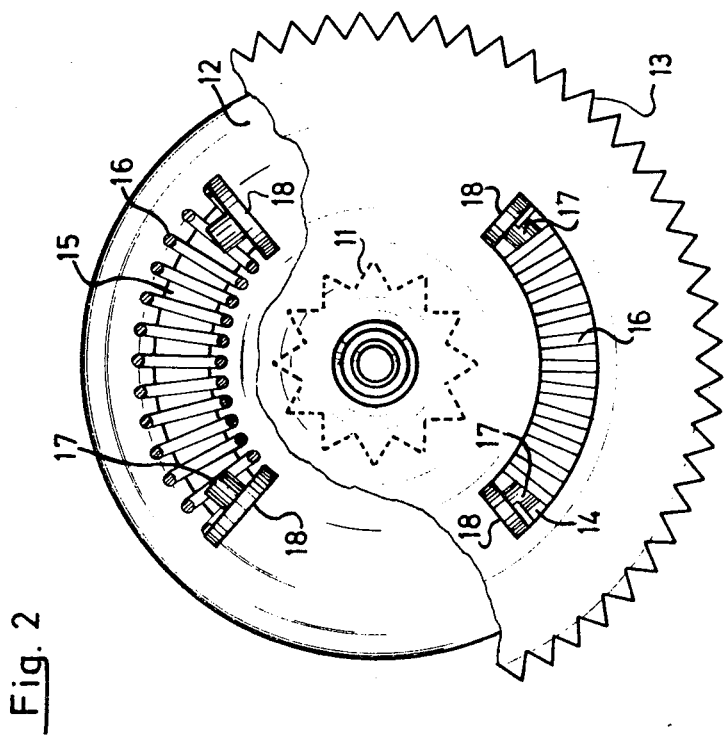
Figure 4:
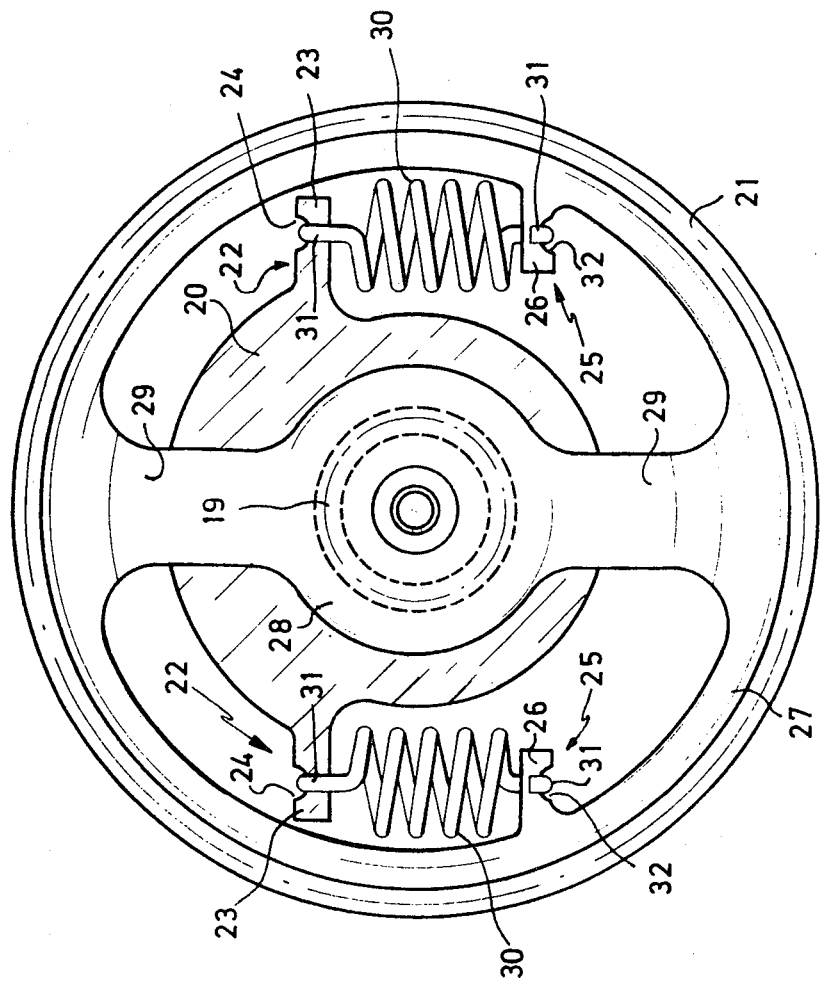

FIG. 1 is a part sectional view of a first embodiment;
FIG. 2 is an enlarged detail of FIG. 1;
FIG. 3 is a detailed section of FIG. 2; and
FIG. 4 is an enlarged detail of a second embodiment.

The instrument shown in FIGS. 1 to 3 is a dial gauge comprising a slide rule 1 relative to which is displaced a slide or movable measuring member 2, the slide rule 1 and the member 2 each having at one of their ends the conventional measuring contacts and jaws 3. To the movable member 2 is fitted a dial indicator unit 4 wherein is rotatably mounted an indicator member 5 facing the dial 6. The movements of the indicator member 5 are amplified by a geared multiplier mechanism 7 controlling a pinion 8 integral with the indicator member 5, said mechanism being driven by a rack 9 fitted to the slide rule. The pinion 8 and the mechanism 7 are mounted between plates 10 located in the unit 4.

The multiplier mechanism 7 comprises a pinion 11 meshing with the rack 9, this pinion 11 being coaxial and integral with a disk 12 rotatably mounted between the plates 10 and located opposite a toothed wheel 13 freely rotatable between the plates 10, coaxial to the disk 12 and the pinion 11 and meshing with the pinion 8 of the indicator member 5. The toothed wheel 13 is slotted to provide two diametrically opposed arcuate recesses 14 which are disposed opposite two similar recesses 15 made in the disk 12. Between the disk 12 and the wheel 13 are placed two compression springs 16 of which the sides are respectively located in pairs of facing recesses 14 and 15 and the ends of which are engaged on studs 17 of stops 18 also located in the pairs of recesses 14 and 15 and supported against the ends of these latter. The springs 16 and stops 18 have substantially the same diameter and each spring 16 has a length and diameter respectively greater than the length and height of the recesses 14 and 15. Therefore, the springs 16 are guided laterally and retained longitudinally by the recesses 14 and 15 which maintain them under compression, while the stops 18 ensure a regular support at the ends of said springs. Consequently the springs 16 provide a flexible assembly without any play between the disk 12 and the wheel 13.

The instrument described functions as follows: when the movable member 2 is moved along the slide rule 1, the pinion 11 meshed with the rack 9 rotates and drives the disk 12 with which it is integral. The disk 12 transmits its movement to the springs 16 which drive the wheel 13 and the latter operates the pinion 8 and the indicator member 5. If the movable member 2 is subjected to sudden acceleration and deceleration, for example at the start or end of its travel or when moved by sharp blows, as a result of the inertia of the assembly of the indicator member 5, pinion 8 and toothed wheel 13, this inertia being very important due to the large acceleration or deceleration caused by the great multiplication of the system, the disk 12 driven by the pinion 11 will rotate whereas the assembly of the toothed wheel 13, pinion 8 and indicator member 5 will not move. Thus the springs 16 will be compressed before transmitting the movement and will absorb a large part of the energy thus preventing the breaking of the gears. Once this shock absorption has been effected, the springs 16 will take up their original position and, if need be, transmit the movement to the toothed wheel 13, and consequently to the pinion 8 and indicator member 5.

The second embodiment shown in FIG. 4 is a gauge similar to that of FIG. 1 and only the multiplier mechanism is shown. This mechanism comprises a pinion 19 meshing with the rack (not shown) of the instrument, this pinion being coaxial and integral with a disk 20 mounted rotatably between the (not shown) plates of the dial-type indicator of the instrument. The disk 20 is located facing a toothed wheel 21 rotating freely between the plates, coaxial to the disk 20 and meshing with the pinion (not shown) driving the indicator member of the dial-type indicator.

The disk 20 has two symmetrical fixing points 22 and each consisting of a radial finger 23 extending along the periphery of the disk 20 and provided with a notch 24. The toothed wheel 21 comprises a toothed rim 27 connected to a wheel 28 by two spokes 29 and also having two symmetrical fixing points 25, each comprising a radial finger 26 extending within the rim 27 and having a notch 32.

Between the disk 20 and toothed wheel 21 are placed two tension springs 30 each having at their ends a fixing hook 31. Each spring 30 is fixed to the corresponding fingers of the wheel 21 and disk 20 by engagement of the hooks 31 in the notches 24 and 32. The length of the springs 30 is such that when the springs are connected they are under tension. Under these conditions the springs form a flexible assembly, without play between the disk 20 and the toothed wheel 21.

This second form of embodiment performs as previously, except that during the relative movement of the disk 20 and wheel 21, one of the springs 30 tightens while the other relaxes.

While the two described embodiments each have two shock absorbing springs this number can be increased. It is also possible to replace these springs by flexible members of another type, for example rubber members.

The instrument according to the invention has an effective absorption of the forces to which gears of its dial-type indication system are subjected; said absorption being effected in both directions of movement of the movable measuring member. In addition, there is no difficulty in dimensioning these members in such a way as to obtain all the desired robustness and its manufacture and assembly are simple.

What we claim is:

1. A dial-type measuring instrument comprising a geared multiplier mechanism intended to amplify the movements of a movable indicator member facing the dial wherein the multiplier mechanism comprises a disk driven by the movable measuring member of the instrument and located opposite a toothed wheel which serves to control the movements of the indicator member and is coaxial with the disk; said toothed wheel formed with at least two recessed slots for respectively supporting the sides of at least two compression elements, said disk also formed with at least two similar slots for respectively supporting the other sides of said compression elements; each of said springs having one end engaging a stop on the toothed wheel and the other end engaging a stop on the disk.

2. An instrument according to claim 1 wherein said end portions of said compression elements engage directly on the end portion of the recessed slots.

3. An instrument according to claim 1 wherein the ends of said compression elements are respectively engaged on disks including a short rod projecting from its center.

4. An instrument according to claim 3 wherein the disks are supported on the end portions of said slots.

* * * * *